(12) United States Patent
Sayin et al.

(10) Patent No.: US 11,151,869 B2
(45) Date of Patent: Oct. 19, 2021

(54) MANAGING ROADWAY INTERSECTIONS FOR VEHICLES

(71) Applicant: TOYOTA JIDOSHA KABUSHIKI KAISHA, Toyota (JP)

(72) Inventors: Muhammed O. Sayin, Mountain View, CA (US); Chung-Wei Lin, Mountain View, CA (US); Shinichi Shiraishi, Mountain View, CA (US)

(*) Notice: Subject to any disclaimer, the term of this patent is extended or adjusted under 35 U.S.C. 154(b) by 0 days.

(21) Appl. No.: 15/924,979

(22) Filed: Mar. 19, 2018

(65) Prior Publication Data
US 2019/0287396 A1 Sep. 19, 2019

(51) Int. Cl.
*G08G 1/07* (2006.01)
*G08G 1/01* (2006.01)
*G08G 1/095* (2006.01)

(52) U.S. Cl.
CPC ............ *G08G 1/07* (2013.01); *G08G 1/0116* (2013.01); *G08G 1/0125* (2013.01); *G08G 1/0145* (2013.01); *G08G 1/095* (2013.01)

(58) Field of Classification Search
CPC ........... G06K 9/00812; G06K 9/00771; G06K 7/10475; B61L 29/00; B61L 29/28; B61L 5/06; B61L 5/12; B61L 5/20; G07B 15/02; G01C 21/3415; G01C 21/3691; G01C 21/3697; G05D 1/0285; G05D 1/0287; G08G 1/07; G08G 1/14; G08G 1/142; G08G 1/147; G08G 1/0141; G08G 1/0112; G08G 1/0116; G08G 1/0133; G08G 1/0145; G08G 1/08; G08G 1/0965; G08G 1/096725; G08G 1/096741; G08G 1/096775; G08G 1/0968; G08G 1/096816; G08G 1/096844; G08G 1/205; H04Q 9/00; H04Q 2209/47
See application file for complete search history.

(56) References Cited

U.S. PATENT DOCUMENTS 8,811,343 B2 * 8/2014 Kim .................. H04W 36/32
                                                    370/331
2010/0332242 A1 * 12/2010 Kamar ................ G06Q 10/02
                                                    705/1.1
(Continued)

FOREIGN PATENT DOCUMENTS

KR         20160139505 A  * 12/2016

*Primary Examiner* — Hai Phan
*Assistant Examiner* — Anthony D Afrifa-Kyei
(74) *Attorney, Agent, or Firm* — Burbage Law, P.C.; Jon-Michael Burbage; Elizabeth Ruzich

(57) ABSTRACT

The disclosure includes embodiments for managing roadway intersections for vehicles. A method includes receiving, at a connected roadway device, request messages from a first vehicle and an other vehicle to reserve an intersection. The method further includes checking time-token balances associated with the first vehicle and the other vehicle. The method further includes responsive to the time-token balances being positive for both of the time-token balances, reserving the intersection for the first vehicle based on the request messages. The method further includes transmitting reservation data to the first vehicle and the other vehicle. The method further includes transmitting a traffic light control message to a traffic light, wherein the traffic light control message instructs the traffic light to display a green light while the first vehicle moves through the intersection.

20 Claims, 10 Drawing Sheets

(56) References Cited

U.S. PATENT DOCUMENTS

| | | | |
|---|---|---|---|
| 2011/0066532 A1* | 3/2011 | Schonberg | G06Q 40/06 |
| | | | 705/35 |
| 2014/0210646 A1 | 7/2014 | Subramanya | |
| 2014/0278061 A1* | 9/2014 | Michael | G01C 21/3605 |
| | | | 701/423 |
| 2015/0170310 A1* | 6/2015 | Amento | G06Q 20/145 |
| | | | 705/13 |
| 2016/0055746 A1* | 2/2016 | Taylor | G08G 1/0125 |
| | | | 340/906 |
| 2019/0265059 A1* | 8/2019 | Warnick | G05D 1/0291 |

* cited by examiner

450

DSRC Data 155

Part 1
Sensor Data 157 including:
(1) GPS Data (local 3D)
- Latitude
- Longitude
- Elevation
- Positional accuracy
- Time (2) Vehicle Motion Data
- Transmission state
- Speed
- Heading
- Steering wheel angle
- Acceleration set (4-way, i.e., 3 axes of acceleration plus yaw rate
- Brake system status (3) Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
Driver Data 159

Figure 4B

MANAGING ROADWAY INTERSECTIONS FOR VEHICLES

BACKGROUND

The specification relates to managing roadway intersections for vehicles.

Intersections play a significant role in traffic congestion within a traffic network. As the population increases, traffic congestion is becoming increasingly problematic. There are currently some sensor-based systems that attempt to manage traffic flow through intersections with the goal of decreasing overall traffic congestion. A problem with this approach is that experience has shown that these systems are not very effective at improving traffic congestion. Furthermore, these systems fail to account for other factors, such as emergency vehicles or vehicles with multiple travelers that should be rewarded for reducing the overall traffic congestion through carpooling.

SUMMARY

Described herein is a method for managing traffic intersection for vehicles. A method includes receiving, at a connected roadway device, request messages from a first vehicle and an other vehicle to reserve an intersection. The method further includes checking time-token balances associated with the first vehicle and the other vehicle. The method further includes responsive to the time-token balances being positive for both of the time-token balances, reserving the intersection for the first vehicle based on the request messages. The method further includes transmitting reservation data to the first vehicle and the other vehicle. The method further includes transmitting a traffic light control message to a traffic light, wherein the traffic light control message instructs the traffic light to display a green light while the first vehicle moves through the intersection.

In some embodiments, the method further includes responsive to a time-token balance corresponding to the first vehicle being zero or negative, updating an urgency level associated with the first vehicle to be a lowest urgency level and reserving the intersection for the first vehicle based on the lowest urgency level and the request messages. The method may further include conducting time-token transactions based on how reserving the intersection for the first vehicle affects the other vehicle, wherein the time-token transactions are based on the lowest urgency level associated with the first vehicle, the urgency level associated with the other vehicle, a number of travelers in the first vehicle and the other vehicle, and the time-token balances corresponding to the first vehicle and the other vehicle. In some embodiments, an amount of conducted time-token transactions on each time-token account is computed using a Vickrey-Clarke-Groves (VCG) mechanism. In some embodiments, the request messages each include a basic safety message and the method further includes determining whether the first vehicle and other vehicles will be at the intersection at substantially a same time and conducting time-token transactions based on how reserving the intersection for the first vehicle affects the other vehicles. In some embodiments, the connected roadway device is a roadside unit (RSU). In some embodiments, the request messages are received via a dedicated short range communication (DSRC).

A system can comprise one or more computer that are configured to perform particular operations or actions by virtue of having software, firmware, hardware, or a combination of them installed on the system that in operation causes the system to perform the actions. One or more computer programs can be configured to perform particular operations or actions One or more computer programs can be configured to perform particular operations or actions by virtue of including instructions that, when executed by data processing apparatus, cause the apparatus to perform the actions. In some embodiments, the system includes one or more processors of a connected roadway device that is DSRC-enabled and that includes a non-transitory memory storing computer code which, when executed by the one or more processors causes the one or more processors to receive request messages from a first vehicle and an other vehicle to reserve an intersection, check time-token balances associated with the first vehicle and the other vehicle, responsive to the time-token balances being positive for both of the time-token balances, reserve the intersection for the first vehicle based on the request messages, transmit reservation data to the first vehicle and the other vehicle, and transmit a traffic light control message to a traffic light, wherein the traffic light control message instructs the traffic light to display a green light while the first vehicle moves through the intersection.

In some embodiments, the computer code is further operable to cause the one or more processors to: responsive to a time-token balance corresponding to the first vehicle being zero or negative, update an urgency level associated with the first vehicle to be a lowest urgency level and reserve the intersection for the first vehicle based on the lowest urgency level and the request messages. In some embodiments, the computer code is further operable to cause the one or more processors to: conduct time-token transactions based on how reserving the intersection for the first vehicle affects the other vehicle, wherein the time-token transactions are based on the lowest urgency level associated with the first vehicle, the urgency level associated with the other vehicle, a number of travelers in the first vehicle and the other vehicle, and the time-token balances corresponding to the first vehicle and the other vehicle. In some embodiments, an amount of conducted time-token transactions on each time-token account is computed using a VCG mechanism. In some embodiments, the request messages each include a basic safety message and the computer code is further operable to cause the one or more processors to: determine whether the first vehicle and other vehicles will be at the intersection at substantially a same time and conduct time-token transactions based on how reserving the intersection for the first vehicle affects the other vehicles. In some embodiments, the connected roadway device is a RSU. In some embodiments, the request messages are received via DSRC.

One general aspect includes a non-transitory memory encoded with a computer program, the computer program comprising instructions that, when executed by one or more processors, cause the one or more processors to perform operations comprising receiving, at a connected roadway device, request messages from a first vehicle and an other vehicle to reserve an intersection, checking time-token balances associated with the first vehicle and the other vehicle, responsive to the time-token balances being positive for both of the time-token balances, reserving the intersection for the first vehicle based on the request messages, transmitting reservation data to the first vehicle and the other vehicle, and transmitting a traffic light control message to a traffic light, wherein the traffic light control message instructs the traffic light to display a green light while the first vehicle moves through the intersection.

In some embodiments, the operations further comprise responsive to a time-token balance corresponding to the first vehicle being zero or negative, updating an urgency level associated with the first vehicle to be a lowest urgency level and reserving the intersection for the first vehicle based on the lowest urgency level and the request messages. In some embodiments, instructions are further operable to perform operations comprising conducting time-token transactions based on how reserving the intersection for the first vehicle affects the other vehicle, wherein the time-token transactions are based on the lowest urgency level associated with the first vehicle, the urgency level associated with the other vehicle, a number of travelers in the first vehicle and the other vehicle, and the time-token balances corresponding to the first vehicle and the other vehicle. In some embodiments, an amount of conducted time-token transactions on each time-token account is computed using a VCG mechanism. In some embodiments, the request messages each include a basic safety message and the instructions are further operable to perform operations comprising: determining whether the first vehicle and other vehicles will be at the intersection at substantially a same time and conducting time-token transactions based on how reserving the intersection for the first vehicle affects the other vehicles. In some embodiments, the connected roadway device is an RSU.

The specification describes numerous advantages. First, the specification describes systems and methods for managing traffic flow at roadway intersections in such a way that overall traffic congestion is improved. Second, the system is an improvement over existing solutions because it includes a traffic management application that uses more than sensor measurements including urgency of a journey and a number of passengers. The traffic management application advantageously ensures that the data used to manage the traffic is accurate. Third, the systems and methods maintain the safety of vehicles that do not include a reservation application, thus ensuring that traffic management works seamlessly regardless of the software stored on the vehicles. Fourth, the systems and methods improve safety by configuring intersections to allow emergency vehicles to have priority in passing through intersections.

BRIEF DESCRIPTION OF THE DRAWINGS

The disclosure is illustrated by way of example, and not by way of limitation in the figures of the accompanying drawings in which like reference numerals are used to refer to similar elements.

FIG. 4B is a block diagram illustrating another example of DSRC data according to some embodiments.

DETAILED DESCRIPTION

Example System

Figure 1:
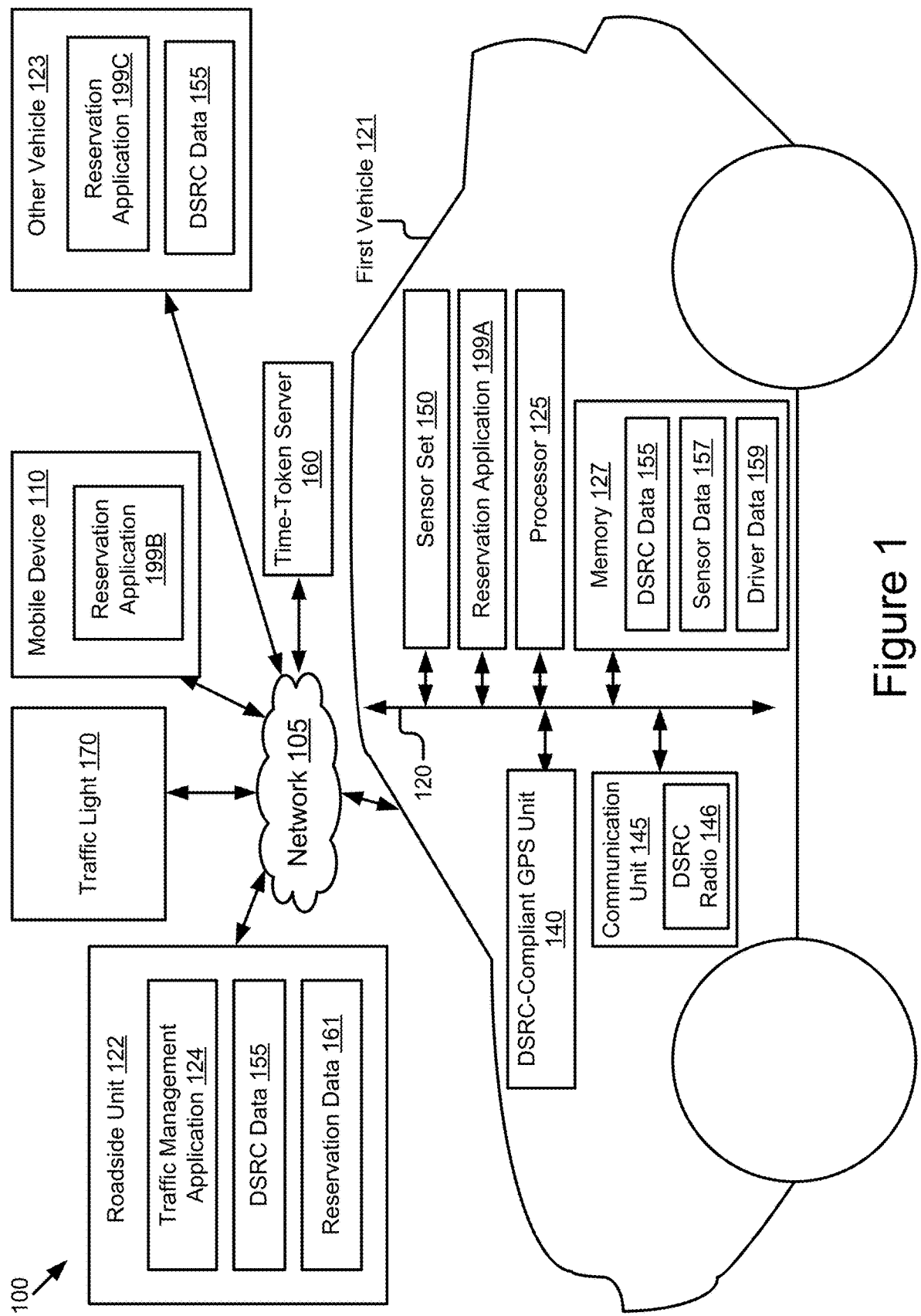
FIG. 1 is a block diagram illustrating an operating environment for managing roadway interactions according to some embodiments.

Referring to FIG. 1, is an operating environment 100 for a reservation application 199 and a traffic management application 124 according to some embodiments. As depicted, the operating environment 100 includes the following elements: a first vehicle 121, an RSU 122, a time-token server 160, a traffic light 170, a mobile device 110, and other vehicles 123. These elements are communicatively coupled to one another by a network 105.

Although one first vehicle 121, one RSU 122, one time-token server 160, one traffic light 170, one mobile device 110, one other vehicle 123, and one network 105 are depicted in FIG. 1, in practice the operating environment 100 may include one or more first vehicles 121, one or more RSUs 122, one or more time-token servers 160, one or more traffic lights 170, one or more mobile devices 110, one or more second vehicles 123, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, long-term evolution (LTE), LTE-vehicle to everything (V2X), LTE-D2D, VoLTE or any other mobile data network or combination of mobile data networks. Further, the network 105 may include one or more IEEE 802.11 wireless networks.

The first vehicle 121 is any type of vehicle with an onboard vehicle computer that is enabled for DSRC communication. For example, the first vehicle 121 is one of the following types of vehicles: a car; a truck; a sports utility vehicle; a bus; a semi-truck; a drone; or any other roadway-based conveyance. The first vehicle 121 may include a processor 125, a memory 127, a DSRC-compliant GPS unit 140, a communication unit 145, a sensor set 150, and a reservation application 199A. Each of the elements communicate via a bus 120.

In FIG. 1 and the remaining figures, a letter after a reference number represents a reference to the element having that particular reference number. For example, 199A refers to reservation application on the first vehicle 121 and 199B refers to reservation application on the mobile device 110. A reference number in the text without a following letter represents a general reference to embodiments of the element bearing that reference number. For example, 199 refers to the reservation application in general.

In some embodiments, the processor 125 and the memory 127 may be elements of an onboard unit. The onboard unit includes an electronic control unit (herein "ECU") or an onboard vehicle computer system that may be operable to cause or control the operation of the reservation application 199. The onboard unit may be operable to access and execute the data stored on the memory 127 to provide the functionality described herein for the reservation application 199 or its elements. The onboard unit may be operable to execute the reservation application 199 which causes the onboard unit to execute one or more of the steps of the method 900 described below with reference to FIG. 9.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first vehicle 121 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The other vehicle 123 may include one or more memories 127.

The memory 127 of the first vehicle 121 stores one or more of the following types of digital data: DSRC data 155, sensor data 157, and driver data 159. In some embodiments, the memory 127 stores any data that is necessary for the reservation application 199A to provide its functionality.

DSRC data 155 is data that is transmitted by a DSRC radio 146 of the communication unit 145. In some embodiments, the DSRC data 155 may include data generated by the DSRC-compliant GPS unit 140, the sensor set 150, and the reservation application 199. In some embodiments, the DSRC data 155 includes sensor data 157 and driver data 159. The DSRC data 155 is discussed in greater detail below with reference to FIGS. 4A and 4B. The DSRC data 155 is transmitted at regular intervals (once every 0.10 seconds as specified by the DSRC standard) or when the first vehicle is located near a traffic light 170 or an RSU 122.

Sensor data 157 is digital data that may be generated by the DSRC-compliant GPS unit 140 and the sensor set 150. The sensor data 157 describes, among other things, the location of the first vehicle 121 with lane-level accuracy, the heading of the first vehicle 121, the velocity of the first vehicle 121, the transmission state of the first vehicle 121, the steering wheel angle, the current time of day, the acceleration set, the brake system status, the status of any advanced driver assistance systems (ADAS systems) of the first vehicle 121, the first vehicle 121 path history, whether the first vehicle's 121 lights are on, whether the first vehicle 121 is currently hard braking and other information.

Driver data 159 is digital data that describes the driver-exclusive information. For example, the driver data 159 may include information about a journey to be taken by the first vehicle 121 (e.g., a start point and an end point), a number of travelers in the first vehicle 121, an urgency associated with the first vehicle 121, etc. In some embodiments, the driver data 159 is received from information that a user provides to the reservation application 199A.

In some embodiments, the DSRC-compliant GPS unit 140 includes any hardware and software necessary to make the first vehicle 121 or the DSRC-compliant GPS unit 140 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface.

In some embodiments, the DSRC-compliant GPS unit 140 includes hardware that wirelessly communicates with a GPS satellite to retrieve sensor data 157 that describes the geographic location of the first vehicle 121 with a precision that is compliant with the DSRC standard. The DSRC standard requires that sensor data 157 be precise enough to infer if two vehicles (one of which is, for example, first vehicle 121) are located in adjacent lanes. In some embodiments, the DSRC-compliant GPS unit 140 is operable to identify, monitor, and track its two-dimensional position within 1.5 meters of its actual position 68% of the time under an open sky. Since traffic lanes are typically 3.7 meters wide, whenever the two-dimensional error of the sensor data 157 is less than 1.5 meters, the sensor data 157 may be analyzed to determine what lane the first vehicle 121 is travelling in based on the relative positions of two or more travelling vehicles (one of which is, for example, first vehicle 121) in multiple lanes at the same time. As a result, the sensor data 157 provides lane-level accuracy of the location of the first vehicle 121. The DSRC-compliant GPS unit 140 may generate the sensor data 157 periodically, such as every 100 msec.

The communication unit 145 transmits and receives data to and from the network 105 or to another communication channel. For example, the communication unit 145 transmits DSRC data 155 to the network 105, which sends it to the RSU 122. In some embodiments, the communication unit 145 may include a DSRC radio 146 and other hardware or software necessary to make the first vehicle 121 a DSRC-equipped vehicle.

In some embodiments, the communication unit 145 includes a port for direct physical connection to the network 105 or to another communication channel. For example, communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); EN 13372:2004 Dedicated Short-Range Communication—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a DSRC radio 146. The DSRC radio 146 is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 146 includes a non-transitory memory, which stores digital data that controls the frequency for broadcasting DSRC messages. In some embodiments, the non-transitory memory stores a buffered version of the DSRC data 155 for the first vehicle 121 so that the DSRC data 155 for the first vehicle 121 is broadcast as an element of the DSRC messages, which are regularly broadcast by the DSRC radio 146.

In some embodiments, the DSRC radio 146 includes any hardware or software which is necessary to make the first vehicle 121 compliant with the DSRC standards. In some embodiments, the DSRC-compliant GPS unit 140 is an element of the DSRC radio 146.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz.

The DSRC messages are communicated using a vehicular-adapted wireless messaging protocol. One type of DSRC message is known as a Basic Safety Message ("BSM" if singular or "BSMs" if plural). A BSM includes BSM data. The BSM data describes attributes of the vehicle. For example, the BSM may include two parts that are discussed in greater detail below with reference to FIG. 4B.

The BSM may be broadcast at a bandwidth between 5.850 and 5.925 gigahertz. The transmission range of the BSM may be as large as 1,000 meters. DSRC-enabled vehicles broadcast a BSM at a regular interval, which is referred to below as a "time frame." In some embodiments, a radar interference management system is programmed with a default time frame value, for example, 0.01 seconds. The time frame may be user adjustable. In some embodiments, the BSM is broadcast at an adjustable rate of once every 0.10 seconds.

The sensor set 150 may include one or more devices that provide sensor data 157 about a vehicle operation. For example, the sensor set 150 may include one or more sensors that detect a presence of objects that surround the vehicle 123. The sensor set 150 may be communicatively coupled to an onboard computer of a vehicle so that the sensor data 157 may be stored in the memory 127 and accessible by the reservation application 199.

The sensors included in the sensor set 150 may include one or more external sensors such as one or more of the following: a camera or camera array mounted to the exterior of the other vehicle 123, a microphone; a moisture sensor, a thermometer; an altimeter; an accelerometer; a WiFi sniffer; a Bluetooth antenna; a LIDAR camera; a humidistat; an infrared camera, etc.

The sensor set 150 may include a speedometer, a compass, an infrared detector, a motion detector, a thermostat, sensors that description the operation of ADAS systems, accelerometers, and any other sensors that are necessary to record GPS data, heading data, velocity data, first vehicle 121 motion data, first vehicle 121 size data, first vehicle 121 path history, and other elements of the sensor data 157 that are included in the DSRC data 155. Alternatively or additionally, the sensor set 150 may include a component or module of another system or device included in the first vehicle 121. In some implementations, the sensor set 150 may include sensors for measuring one or more of a current time, a location (e.g., a latitude, longitude, and altitude of a location), a fuel tank level of the first vehicle 121, a battery level of the first vehicle 121, etc.

In some embodiments, the reservation application 199A includes code and routines that are operable, when executed by the processor 125, to cause the processor 125 to execute one or more of the steps of the method 900 described below with reference to FIG. 9. In some embodiments, the reservation application 199A receives driver data 159 from the user, such as a journey the first vehicle 121 is travelling, an urgency level of the journey, and a number of travelers in the first vehicle 121. The reservation application 199A combines the driver data 159 with sensor data 157 to generate DSRC data 155 that is transmitted as a request message. The reservation application 199A transmits the request message to the RSU 122, for example, once every 0.1 seconds as specified by the DSRC standard. The RSU 122 determines whether the first vehicle 121 can reserve the intersection. The reservation application 199A receives reservation data 161 from the RSU 122 that describes whether the first vehicle 121 reserved the intersection.

In some embodiments, the reservation application 199A of the other vehicle 123 may be implemented using hardware including a field-programmable gate array ("FPGA") or an application-specific integrated circuit ("ASIC"). In some other embodiments, the reservation application 199 may be implemented using a combination of hardware and software.

The mobile device 110 may be a computing device that includes a memory, a processor, and that is operable to access the network 105. For example, the mobile device 110, may be a laptop computer, a tablet computer, a mobile telephone, a wearable device, a mobile email device, a portable game player, or any other electronic device capable of accessing the network 105. The mobile device 110 may be used by a passenger of the first vehicle 121.

The mobile device 110 includes a reservation application 199B. In some embodiments, the reservation application 199B has the same components as the reservation application 199A. In some embodiments, the reservation application 199B has fewer components than the reservation application 199B. For example, the reservation application 199B may generate a user interface for a passenger to specify that the passenger is travelling in the first vehicle 121. In another example, the passenger may use the user interface to specify a number of time tokens to use to reserve the intersection.

The RSU 122 may be a stationary device that communicates with vehicles within a particular geographic area. For example, the RSU 122 may transmit and receive DSRC messages, which typically have a maximum range of about 1,000 meters. In some embodiments, the RSU 122 receives request messages that include the DSRC data 155. Although the device is illustrated as an RSU 122, in some embodiments, the device may be any connected roadway device, such as the RSU 122 or an edge server.

The RSU 122 may include DSRC data 155, reservation data 161, and a traffic management application 124. The RSU 122 may receive DSRC data 155 from the first vehicle 121 and other vehicles 123. The DSRC data 155 stored on the RSU 122 may be aggregated DSRC data 155 that is aggregated from the DSRC data 155 received from the first vehicle 121 and the other vehicle 123. The reservation data 161 is digital data that describes what vehicle has reserved the intersection. The reservation data 161 may include a signal status message, traveler information, and map data.

The traffic management application 124 receives the request messages from the first vehicle 121 and the other vehicles 123. The traffic management application 124 determines when the first vehicle 121 and the other vehicles 123 are going to arrive at an intersection with a traffic light 170.

The traffic management application 124 may check a time-token balance associated with the first vehicle 121 and reserve the intersection for the first vehicle 121. The traffic management application 124 may also conduct time-toke transactions based on how reserving the intersection for the first vehicle 121 affects the other vehicles 123. For example, if multiple vehicles are estimated to be at the intersection at the same time, the traffic management application 124 may deduct several time tokens from the first vehicle 121.

As a result of the above steps, the traffic management application 124 may advantageously confirm that the driver data 159 provided by the first vehicle 121 and the other vehicles 123 is accurate. Guaranteeing accuracy is important in order to prevent the drivers from misreporting information described by the driver data 159 in order to rig the operation of the RSU 122 in their favor.

The traffic light 170 may be hardware operable to control the lights at an intersection. The traffic light 170 receives a traffic light control message from the traffic management application 124 of the roadside unit 122 that includes instructions for reserving the intersection for the first vehicle 121 or an other vehicle 123. For example, the RSU 122 may instruct the traffic light 170 to display a green light while the first vehicle 121 moves through the intersection. In some embodiments, the traffic light 170 includes a DSRC radio for receiving the reservation data 161 as a DSRC communication.

The time-token server 160 may include software for managing time tokens. For example, the time-token server 160 may include software that generates a user profile for each user that includes a number of time tokens associated with users. The time-token server 160 may include instructions from the traffic management application 124 of the roadside unit 122 to add or subtract from the time tokens associated with a particular user, such as a driver of the first vehicle 121 or the other vehicle 123.

The other vehicle 123 is any type of vehicle with an onboard vehicle computer that is enabled for DSRC communication. For example, the other vehicle 123 is one of the following types of vehicles: a car; a truck; a sports utility vehicle; a bus; a semi-truck; a drone; or any other roadway-based conveyance. The other vehicle 123 includes a reservation application 199C and DSRC data 155. The other vehicle 123 may transmit a request message to the RSU 122 that includes the DSRC data 155. The reservation application 199C of the other vehicle 123 is similar to the reservation application 199A of the first vehicle 121 and, as a result, will not be described in detail here.

Example First Vehicle

Figure 2:
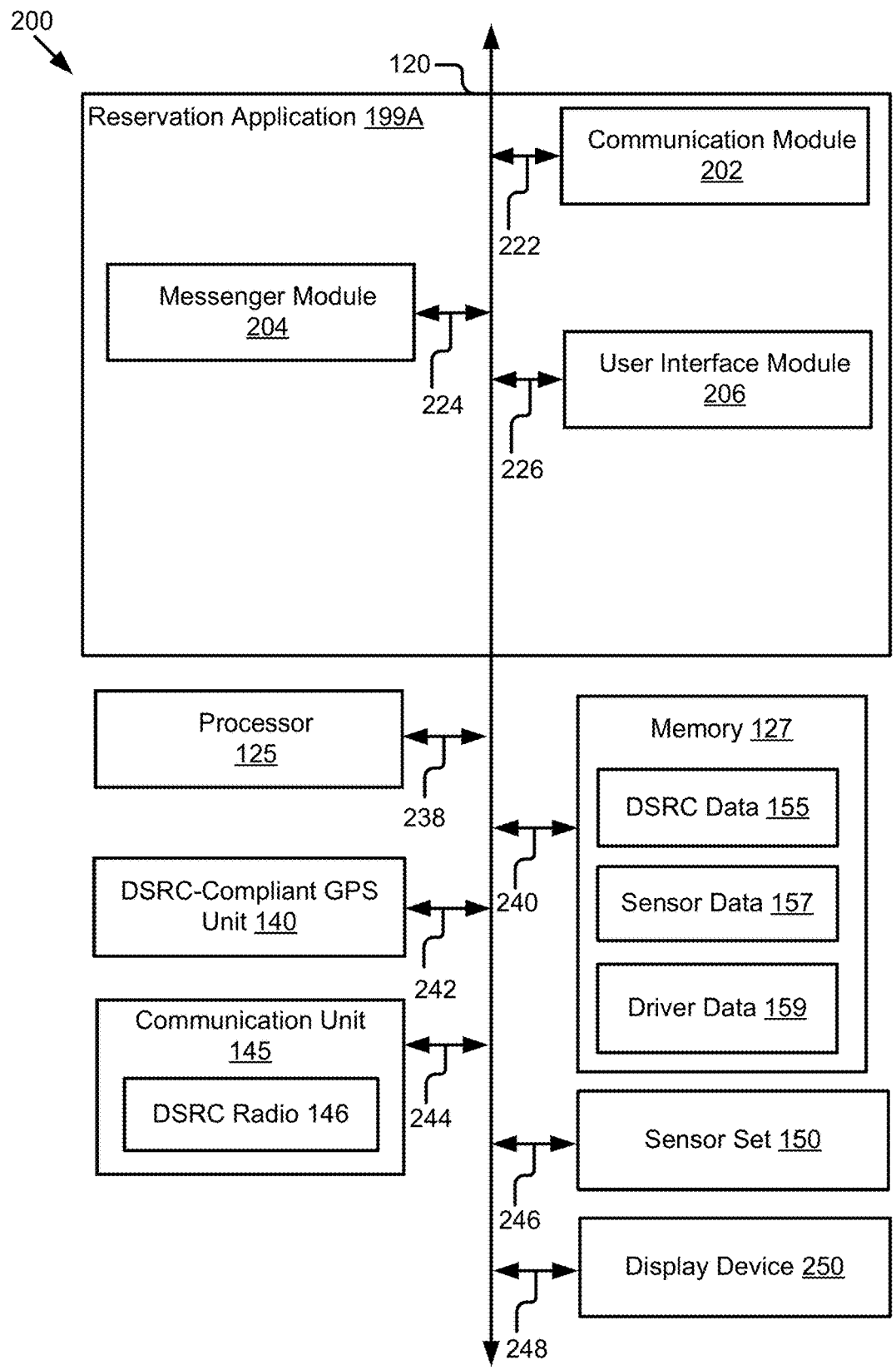
FIG. 2 is a block diagram illustrating an example computer system that includes a reservation application according to some embodiments.

Referring now to FIG. 2, depicted is a block diagram illustrating an example computer system 200 of the first vehicle 121 including the reservation application 199A of the first vehicle 121 of FIG. 1 according to some embodiments.

In some embodiments, the computer system 200 may include a special-purpose computer system that is programmed to perform one or more steps of a method 900 described below with reference to FIG. 9.

In some embodiments, the computer system 200 is an onboard vehicle computer of the first vehicle 121. In some embodiments, the computer system 200 is an onboard unit of the first vehicle 121 of FIG. 1. In some embodiments, the computer system 200 is an ECU, head unit, or some other processor-based computing device of the first vehicle 121 of FIG. 1.

The computer system 200 may include one or more of the following elements according to some examples: the reservation application 199A; the processor 125; the memory 127; the DSRC-compliant GPS unit 140; the communication unit 145; the sensor set 150; and a display device 250. Other elements are not illustrated, but may be included, such as an onboard radar system, an autonomous driver assisted system, etc. The components of the computer system 200 are communicatively coupled by a bus 120.

In the illustrated embodiment, the processor 125 is communicatively coupled to the bus 120 via signal line 238. The memory 127 is communicatively coupled to the bus 120 via signal line 240. The DSRC-compliant GPS unit 140 is communicatively coupled to the bus 120 via signal line 242. The communication unit 145 is communicatively coupled to the bus 120 via signal line 244. The sensor set 150 is communicatively coupled to the bus 120 via signal line 246. The display device 250 is communicatively coupled to the bus 120 via signal line 248.

The following elements of the first vehicle 121 were described above with reference to FIG. 1, and so, those descriptions will not be repeated here: the processor 125; the memory 127; the DSRC-compliant GPS unit 140; the communication unit 145; and the sensor set 150.

The memory 127 may store any of the data described above with reference to FIG. 1. The memory 127 may also store any data needed for the computer system to provide its functionality.

As illustrated, the memory 127 stores: the DSRC data 155; the sensor data 157; and the driver data 159. These elements were described above with reference to FIG. 1, and so, their descriptions will not be repeated here. The memory 127 may also store reservation data 161 received from the RSU 122.

The display device 250 may include hardware that is configured to receive graphical data from the reservation application 199A and display the graphical data. The display device 250 may display a user interface generated by the reservation application 199A. In some embodiments, the display device 250 is touch sensitive and receives input from a driver or a passenger that is used by the reservation application 199A to generate driver data 159. For example, the display device 250 may receive user input regarding a journey to be taken by the first vehicle 121, an urgency level for the journey, and a number of travelers.

The reservation application 199A, as described in greater detail below, generates a request message that includes DSRC data 155 and a request for a reservation of an intersection and, in response to sending the request message, receives reservation data 161 from the RSU 122. In the illustrated embodiment shown in FIG. 2, the reservation application 199A includes a communication module 202, a messenger module 204, and a user interface module 206.

The communication module 202 can be software including routines for handling communications between the reservation application 199A and other components of the computer system 200 or the operating environment 100 of FIG. 1. In some embodiments, the communication module 202 can be a set of instructions executable by the processor 125 to provide the functionality described below for handling communications between the reservation application 199A and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 of FIG. 1. In some embodiments, the communication module 202 receives or transmits, via the communication unit 145, wireless messages to or from the RSU 122. For example, the communication module 202 transmits request messages to the RSU 122 that include DSRC data 155. The communication module 202 may receive reservation data 161 from the RSU 122. The communication module 202 may send or receive any of the data described above with reference to FIG. 1, or below with reference to FIG. 9, via the communication unit 145.

In some embodiments, the communication module 202 receives data from components of the computer system 200 and stores the data in the memory 127 (or a buffer or cache of the memory 127). For example, the communication module 202 receives sensor data 157 from the DSRC-compliant GPS unit 140 and/or the sensor set 150 and stores the sensor data 157 in the memory 127 (or a buffer or cache of the memory 127).

In some embodiments, the communication module 202 may handle communications between components of the reservation application 199A. For example, the communication module 202 transmits driver data 159 generated by the user interface module 206 to the messenger module 204.

The messenger module 204 can be software including routines for generating request messages. In some embodiments, the messenger module 204 can be a set of instructions executable by the processor which, when executed by the processor 125, cause the processor 125 to execute one or more of the steps of the method 900 described below with reference to FIG. 9. In some embodiments, the messenger module 204 can be stored in the memory 127 of the computer system 200 and can be accessible and executable by the processor 125. The messenger module 204 may be adapted for cooperation and communication with the processor 125 and other components of the computer system 200 via signal line 224.

In some embodiments, the messenger module 204 receives sensor data 157 generated by the DSRC-compliant GPS unit 140 and the sensor set 150 via the communication module 202. The sensor data 157 includes a location of the first vehicle 121, a speed (i.e., velocity) of the first vehicle 121, and a heading of the first vehicle 121. The sensor data 157 may include any data that is normally part of a basic safety message (BSM).

In some embodiments, the messenger module 204 receives driver data 159 that describes driver-exclusive information. The driver data 159 may include information about a journey being travelled by the first vehicle 121, an urgency level of the journey, and a number of travelers. The messenger module 204 may instruct the user interface module 206 to generate a user interface that is displayed on the display device 250 so that the driver or a passenger may provide driver data 159. For example, the user interface may prompt a user to provide information about the journey by providing a destination, asking the user interface to provide driving directions, etc. The user interface may also prompt the user to provide a number of travelers in the first vehicle 121 and an urgency associated with the journey (e.g., where the urgency is rated on a scale of 1 to 10 with 10 being the most urgent). In some embodiments, the driver data 159 includes a user identifier that is used to associate the driver with a time-token balance.

Figure 3:
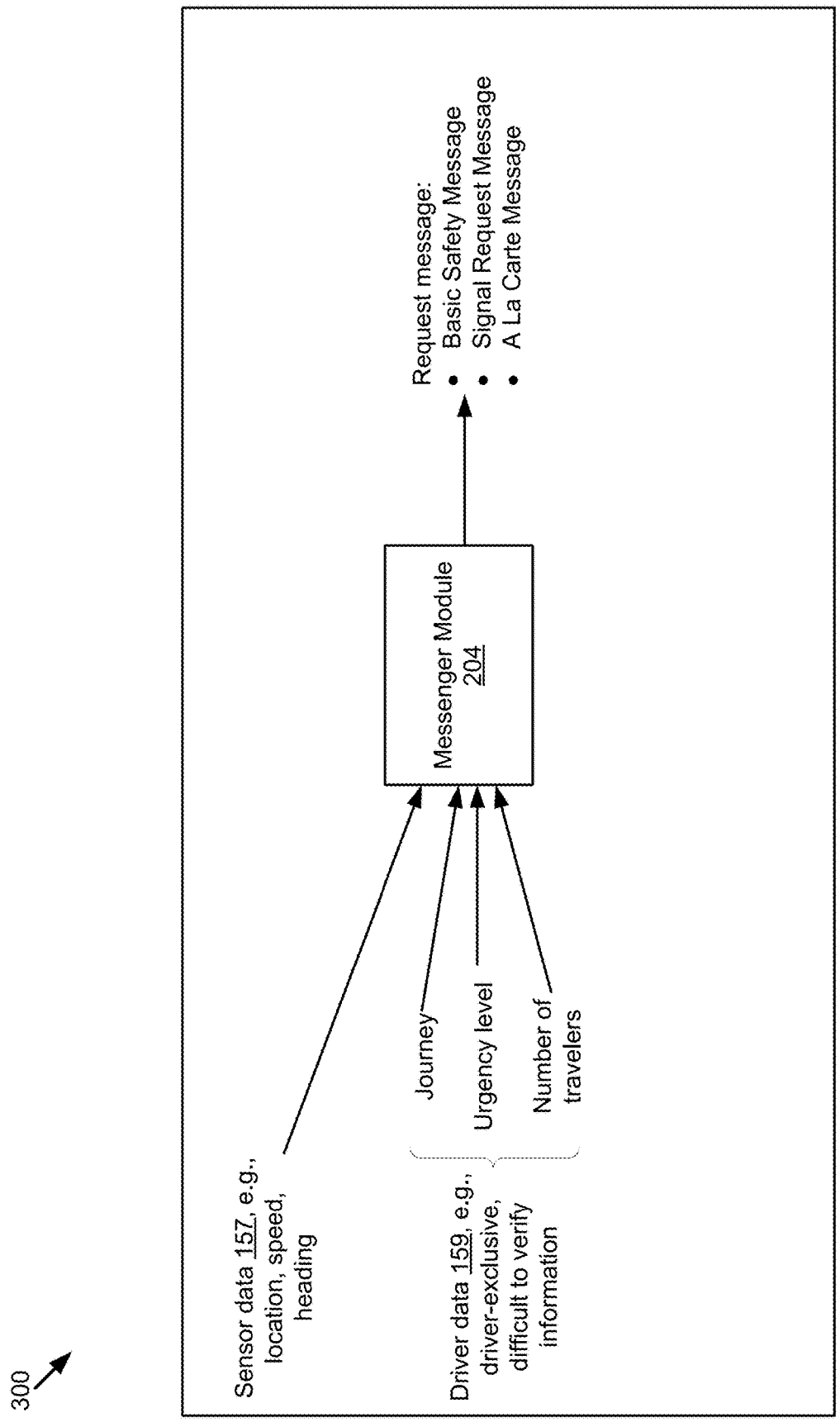
FIG. 3 is a block diagram illustrating how a messenger module generates reservation messages according to some embodiments.

Turning to FIG. 3, a block diagram 300 illustrates how the messenger module 204 generates reservation messages according to some embodiments. The messenger module 204 receives sensor data 157 and driver data 159. The messenger module 204 may combine the sensor data 157 and the driver data 159 to generate DSRC data 155. The messenger module 204 may generate a request message that includes the DSRC data 155.

The request message adheres to DSRC standards and is transmitted to the RSU 122 using the DSRC radio 146. For example, the request message may include messages that are part of the SAE J2735 DSRC standard message sets. In some embodiments, the request message includes a basic safety message (BSM) that includes the sensor data 157, a signal request message that includes both the sensor data 157 and the driver data 159, and an a la carte message includes the driver data 159. The a la carte message is a generic message with flexible content. A signal request message includes a request for either a priority signal or a signal preemption.

Figure 4A:
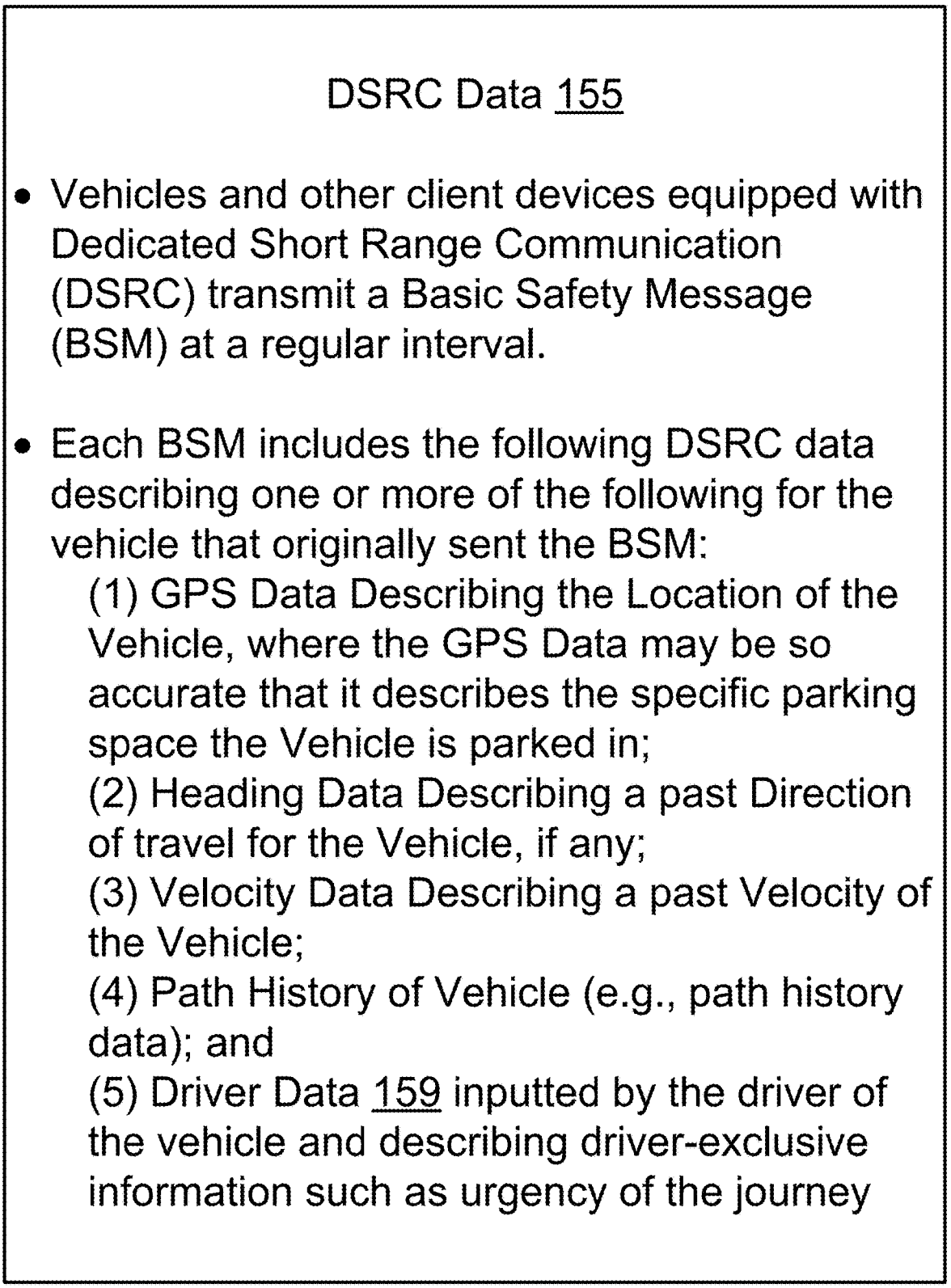
FIG. 4A is a block diagram illustrating example dedicated short-range communication (DSRC) data according to some embodiments.

FIG. 4A is a block diagram 400 illustrating example DSRC data 155 according to some embodiments. The DSRC data 155 includes BSMs where the BSM includes (1) GPS data describing the location of the vehicle, where the GPS data may be so accurate that it describes the specific space the vehicle is parked in; (2) heading data describing a past direction of travel for the vehicle, if any; (3) velocity data describing a past velocity of the vehicle; (4) the path history of the vehicle; and (5) driver data 159 inputted by the driver of the vehicle and describing driver-exclusive information such as an urgency of the journey.

FIG. 4B is a block diagram 450 illustrating another example of DSRC data 155 according to some embodiments. In this example the DSRC data 155 divides the data according to two parts.

Part 1 of the BSM data contains core data elements and is transmitted at an adjustable rate of about 10 times per second. Part 1 of the BSM data may describe one or more of the following: (1) GPS data describing a position of the vehicle; (2) motion data for the vehicle; and (3) vehicle size data. The position of the vehicle may include latitude, longitude, elevation, positional accuracy, and a time associated with the position. The motion of the vehicle may include a transmission state, a speed of the vehicle, a heading of the vehicle, a steering wheel angle of the vehicle, a four-way acceleration set for the vehicle that includes three axes of acceleration plus yaw rate, and a brake system status.

Part 2 of the BSM data may include a variable set of data elements drawn from a list of optional elements. The list of optional elements may include a path history, a path estimation, information about hard active braking, information about a traction control system when it is active over 100 msec, information about an antilock brake system when it is active over 100 msec, a status of lights that are changed, a status of exterior lights, information about a change of the wipers, a status of the wipers, vehicle type, and driver data 159. Some of the BSM data included in Part 2 of the BSM are selected based on event triggers, e.g., anti-locking brake system ("ABS") being activated may trigger BSM data relevant to the ABS system of the vehicle. In some embodiments, the selected data elements are added to part 1 and sent as part of the BSM, but are transmitted less frequently in order to conserve bandwidth. In some embodiments, part 2 also includes current snapshots, with the exception of path data, which is itself limited to a few seconds worth of past history data.

The user interface module 206 can be software including routines for generating graphical data for displaying a user interface. In some embodiments, the user interface module 206 can be stored in the memory 127 of the computer system 200 and can be accessible and executable by the processor 125. The user interface module 206 may be adapted for cooperation and communication with the processor 125 and other components of the computer system 200 via signal line 226.

In some embodiments, the user interface module 206 generates graphical data for displaying a user interface for a user, such as a driver of the first vehicle 121 or passengers in the first vehicle 121. The user interface may be displayed on the display device 250.

The user interface module 206 may generate graphical data for displaying a user interface for the user to input driver data 159. The driver data 159 may include journey data, such as a destination that the first vehicle 121 is travelling towards, an urgency level of the journey, and a number of travelers. The user interface may include options for a user to provide the journey data by typing text in a field or an option for associating the reservation application 199 with other applications, such as a map application, so that the reservation application 199 has access to journey data that describes a journey the driver is taking with the first vehicle 121. In some embodiments the reservation application 199 includes other features, such as a map module that provides driving directions to the driver. In these embodiments, the user interface module 206 may generate graphical data for the other features, such as graphical data for displaying a user interface for inputting a destination with a request button for generating driving directions.

The user interface may include options for a user to input the number of travelers and the urgency level by inputting text, using a drop-down button, etc. A user may provide an urgency, for example, from 1 to 10 where 10 is the most urgent state. For example, if a user is not in a hurry, the user may indicate a low level of urgency, such as 1. If the user is eager to arrive at a destination, the user may indicate an urgency level of 3. If there is an emergency, such as a passenger in the car with a medical emergency, the user may indicate an urgency level of 10. In some embodiments, the user interface module 206 may not allow a user to indicate certain urgency levels based on past use. For example, the user interface module 206 may not allow a user to specify an urgency level of 10 more than twice per month.

Figure 5:
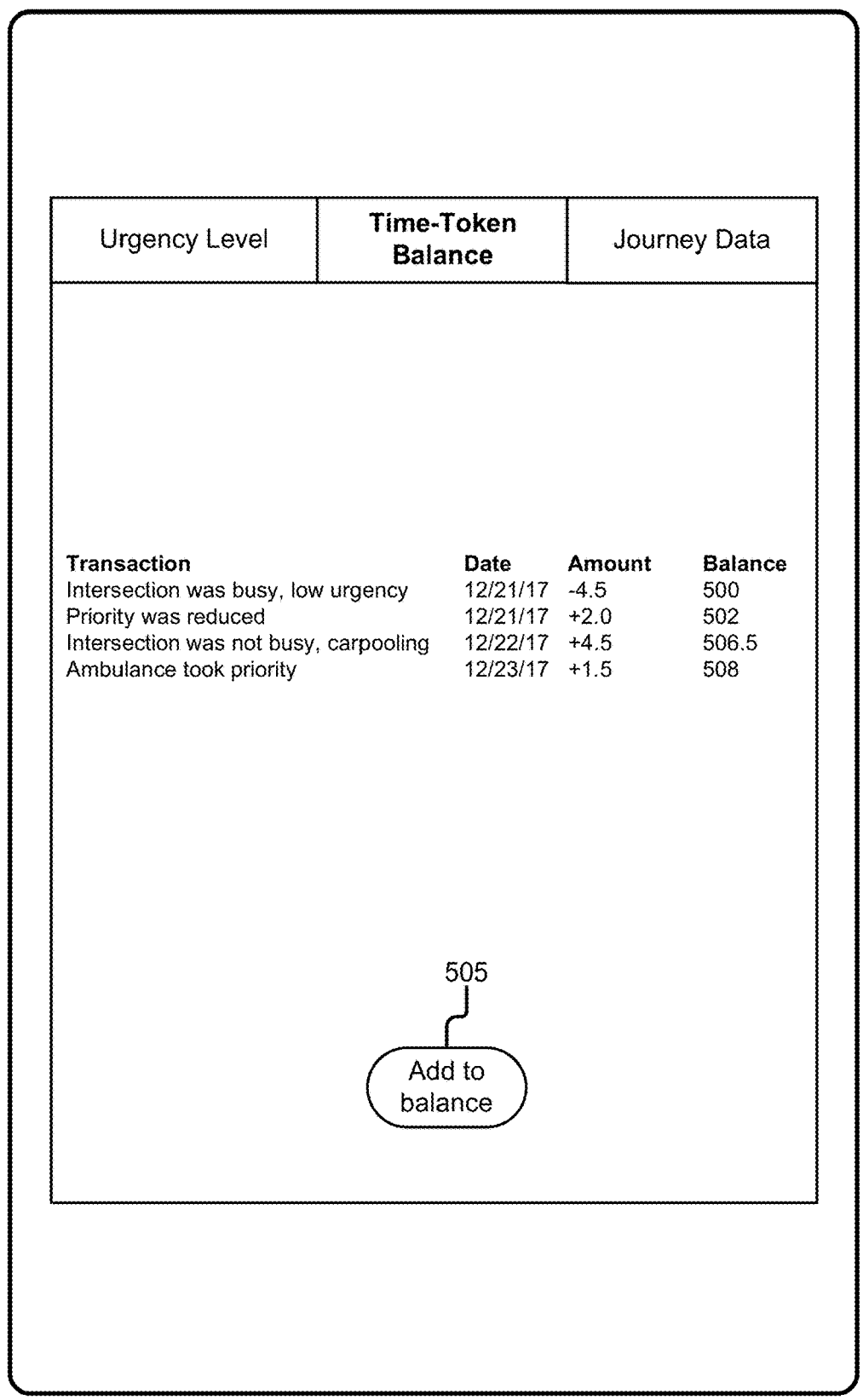
FIG. 5 is a block diagram illustrating an example user interface that includes options for managing time tokens according to some embodiments.

In some embodiments, the user interface module 206 generates graphical data for displaying a user interface that includes information about time tokens associated with a user. FIG. 5 is a block diagram 500 illustrating an example user interface that includes options for managing time tokens according to some embodiments. In this example, the user interface includes three tabs: an urgency level, a time-token balance, and journey data. The time-token balance tab is selected to display a time-token page. The time token page includes a list of transactions with corresponding dates, amounts, and a time-token balance. The transaction includes explanations for why time tokens were credited or debited to the account associated with the user. The user interface also includes an add to balance button 505. In this example, the user may add to the time-token balance by paying money or crypto-currencies, such as Bitcoins.

In some embodiments, the user interface module 206 may generate graphical data for displaying reservation information received from the RSU 122. For example, the user interface may include information about whether the first vehicle 121 successfully reserved an intersection or whether the driver should anticipate having to stop and wait for a traffic light to turn green.

Example Connected Roadway Device

Figure 6:
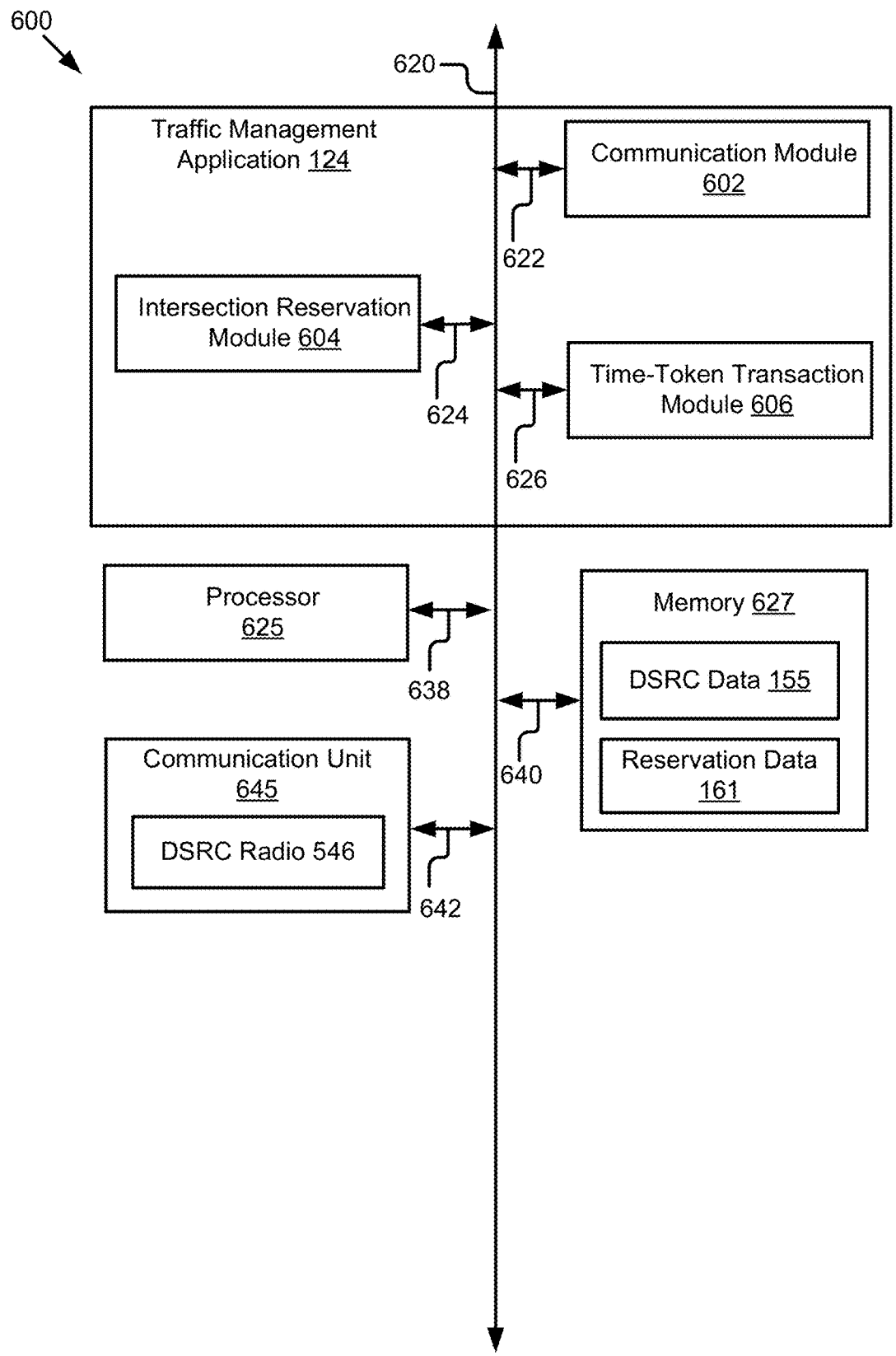
FIG. 6 is a block diagram illustrating an example traffic management application according to some embodiments.

FIG. 6 is a block diagram illustrating an example computer system 600 that includes a traffic management application 124 according to some embodiments. The computer system 600 may be stored in an RSU 122, as illustrated in FIG. 1, or another connected roadway device, such as an edge server.

In some embodiments, the computer system 600 may include a special-purpose computer system that is programmed to perform one or more steps of a method 900 described below with reference to FIG. 9.

The computer system 600 may include one or more of the following elements according to some examples: the traffic management application 124; a processor 625; a memory 627; and a communication unit 645. Other elements are not illustrated, but may be included, such as a mmWave radio. The components of the computer system 600 are communicatively coupled by a bus 620.

In the illustrated embodiment, the processor 625 is communicatively coupled to the bus 620 via signal line 638. The memory 627 is communicatively coupled to the bus 620 via signal line 640. The communication unit 645 is communicatively coupled to the bus 620 via signal line 642. The following elements of the first vehicle 121 were described above with reference to FIG. 1, and so, those descriptions will not be repeated here: the processor 625; the memory 627; and the communication unit 645.

The memory 627 may store any of the data described above with reference to FIG. 1. The memory 627 may also store any data needed for the computer system to provide its functionality. As illustrated, the memory 627 stores: the DSRC data 155 and reservation data 161. These elements were described above with reference to FIG. 1, and so, their descriptions will not be repeated here.

In the illustrated embodiment shown in FIG. 6, the traffic management application 124 includes a communication module 602, an intersection reservation module 604, and a time-token transaction module 606.

The communication module 602 can be software including routines for handling communications between the traffic management application 124 and other components of the computer system 600 or the operating environment 100 of FIG. 1. In some embodiments, the communication module 602 can be a set of instructions executable by the processor 625 to provide the functionality described below for handling communications between the traffic management application 124 and other components of the computer system 600. In some embodiments, the communication module 602 can be stored in the memory 627 of the computer system 600 and can be accessible and executable by the processor 625. The communication module 602 may be adapted for cooperation and communication with the processor 625 and other components of the computer system 600 via signal line 622.

The communication module 602 sends and receives data, via the communication unit 645, to and from one or more elements of the operating environment 100 of FIG. 1. In some embodiments, the communication module 602 receives or transmits, via the communication unit 645, wireless messages from the first vehicle 121, the other vehicle 123, the traffic light 170, and the time-token server 160. For example, the communication module 602 transmits request messages from the first vehicle 121 and the other vehicle 123 that include DSRC data 155. The communication module 602 may transmit reservation data 161 to the first vehicle 121 and the other vehicle 123. The communication module 602 may transmit a traffic light control message to the traffic light 170. The communication module 602 may exchange wireless messages with the time-token server 160 regarding a time-token balance that corresponds to a driver of the first vehicle 121 or the other vehicle 123. The communication module 602 may send or receive any of the data described above with reference to FIG. 1, or below with reference to FIG. 9, via the communication unit 645.

In some embodiments, the communication module 602 receives data from components of the computer system 600 and stores the data in the memory 627 (or a buffer or cache of the memory 127). For example, the communication module 602 receives reservation data 161 from the intersection reservation module 604 and stores the reservation data 161 in the memory 627 (or a buffer or cache of the memory 627).

In some embodiments, the communication module 602 may handle communications between components of the traffic management application 124. For example, the communication module 602 transmits reservation data 161 from the intersection reservation module 604 to the time-token transaction module 606.

The intersection reservation module 604 can be software including routines for reserving intersections for a vehicle. In some embodiments, the intersection reservation module 604 can be a set of instructions executable by the processor 625 which, when executed by the processor 625, cause the processor 625 to execute one or more of the steps of the method 900 described below with reference to FIG. 9. In some embodiments, the intersection reservation module 604 can be stored in the memory 627 of the computer system 600 and can be accessible and executable by the processor 625. The intersection reservation module 604 may be adapted for cooperation and communication with the processor 625 and other components of the computer system 600 via signal line 624.

The intersection reservation module 604 may receive request messages via the communication module 602 from the first vehicle 121 and the other vehicle 123. The request messages include DSRC data 155, which is composed of sensor data 157 and driver data 159. The intersection reservation module 604 extracts the DSRC data 155 from the request message and aggregates the DSRC data 155. In some embodiments, the intersection reservation module 604 cooperates with the time-token transaction module 606 to: (1) determine the accuracy of the driver data 159 included in each instance of DSRC data 155; and (2) generate, based on aggregated DSRC data 155 and the accuracy of the driver-exclusive information, reservation instructions that control the operation of a traffic light 170 that is present at the intersection managed by the connected roadway device.

In some embodiments, the intersection reservation module 604 ensures the accuracy of the driver data 159 received from DSRC data 155 from the first vehicle 121 and the other vehicle 123 by working with the time-token transaction module 606. For example, the intersection reservation module 604 may instruct the time-token transaction module 606 to add to a time-token balance if the corresponding vehicle specified a low urgency level and the vehicle did not receive priority for the intersection. Conversely, the intersection reservation module 604 may instruct the time-token transaction module 606 to deduct from a time-token balance if the corresponding vehicle specified a high urgency level and the vehicle did receive priority for the intersection. This ensures that drivers will not misreport their urgency level for selfish reasons, such as to minimize their own commuting time at the expense of others, because it will cost them time tokens.

In some embodiments, the intersection reservation module 604 uses aggregated sensor data 157 to determine a location of the first vehicle 121 and the other vehicle 123, a direction for each of the vehicles, and determine when they will reach an intersection. For example, the intersection reservation module 604 may generate a map of the first vehicle 121 and the other vehicle 123 as a function of time. The intersection reservation module 604 determines whether to reserve the intersection for one of the vehicles based on the sensor data 157 and the driver data 159. For example, if the first vehicle 121 is scheduled to pass through the intersection before the other vehicle 123, the intersection reservation module 604 may reserve the intersection for the first vehicle 121. Conversely, if the intersection reservation module 604 determines that the first vehicle 121 is predicted to pass through the intersection around the same time as the other vehicle 123 and their travel directions result in needing to reserve the intersection, the intersection reservation module 604 may reserve the intersection for one of the vehicles and/or communicate with the time-token transaction module 606 to determine whether the time-token balance affects whether to reserve the intersection.

In some embodiments, the intersection reservation module 604 uses a heuristic scheduling protocol, such as first-come-first-serve, to determine whether to reserve the intersection for one of the vehicles. In some embodiments, the intersection reservation module 604 also uses confirmed driver data 159 to determine whether to reserve the intersection for one of the vehicles. For example, if the driver data 159 indicates that the first vehicle 121 has a higher urgency level than the other vehicle 123, the intersection reservation module 604 reserves the intersection for the first vehicle 121.

In some embodiments where both the first vehicle 121 and the other vehicle 123 are scheduled to arrive at the intersection around the same time, the intersection reservation module 604 may check the time-token balances associated with the first vehicle 121 and the other vehicle 123. If both of the time-token balances are positive, the intersection reservation module 604 may determine whether to reserve the intersection for the first vehicle 121 or the other vehicle 123 based on the request messages, such as an urgency level associated with each of the vehicles and the number of travelers in the vehicle. If any of the time-token balances are zero or negative, the intersection reservation module 604 may update an urgency level associated with a vehicle to a lowest urgency level. The intersection reservation module 604 may then reserve the intersection based on the updated urgency level and the request messages.

Once the intersection reservation module 604 determines how to reserve the intersection, the intersection reservation module 604 generates reservation data 161 that includes instructions for the operation of the traffic light. The reservation data 161 may include a signal status message, traveler information and map data. The signal status message may convey a status of a signal request, such as the signal request message that was part of the request message sent by the vehicles. The traveler information may include information about advisory and road sign types. The map data may include a geographic description of an intersection. The intersection reservation module 604 may transmit the reservation data 161 to the vehicles and a traffic light control message to the traffic light 170 that includes the reservation data 161. In some embodiments, the traffic light 170 may include a DSRC radio and the traffic light control message as a DSRC communication. In some embodiments, the intersection reservation module 604 may send the reservation data 161 to other traffic management applications 124 and traffic lights 170 at other intersections for an all-inclusive solution across the traffic network in order to enhance the quality of overall transportation.

Figure 7:
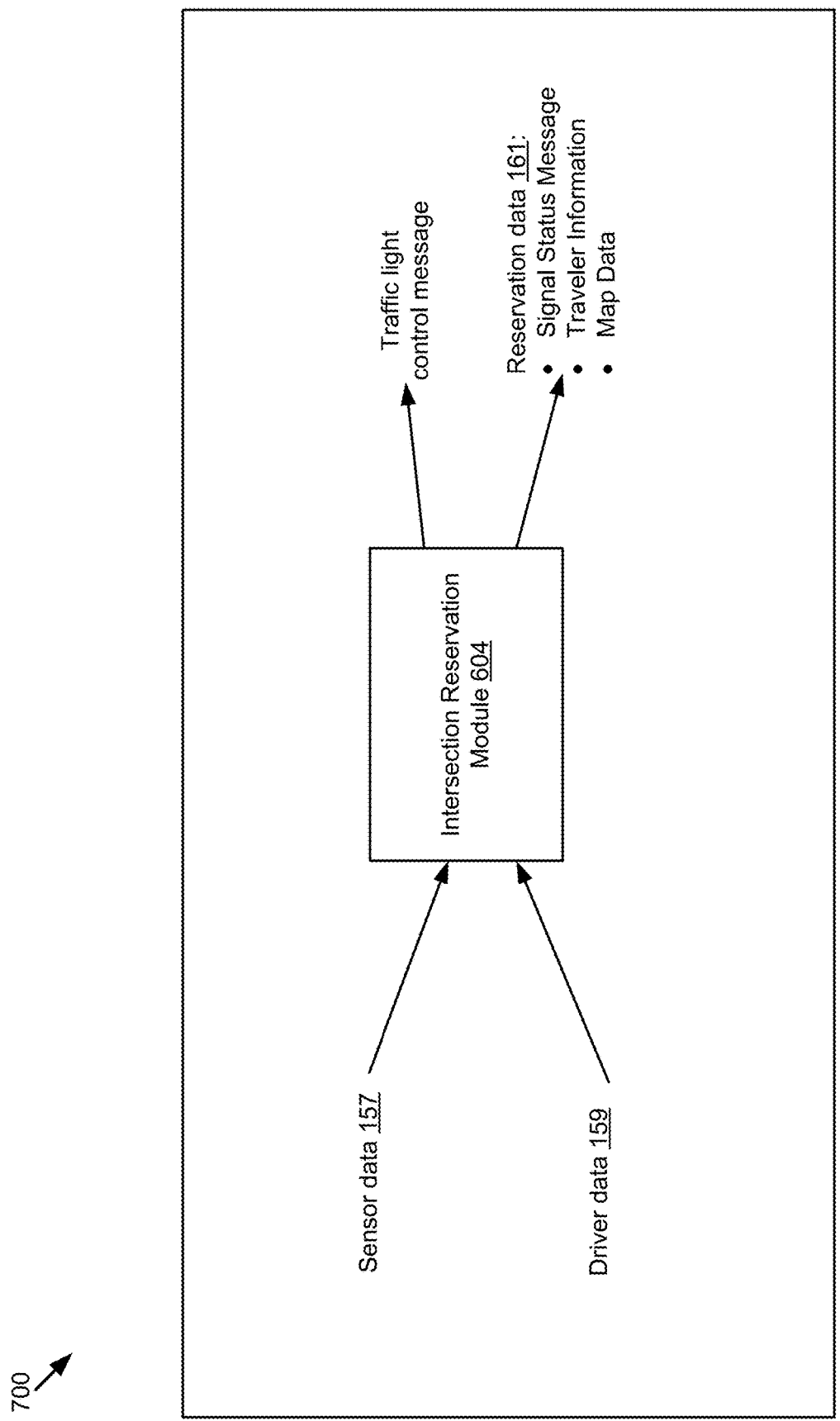
FIG. 7 is a block diagram illustrating how the traffic management application generates a traffic light control message and reservation data according to some embodiments.

FIG. 7 is a block diagram 700 illustrating how the intersection reservation module 604 generates a traffic light control message and reservation data 161 according to some embodiments. In this example, the intersection reservation module 604 receives DSRC data 155 that includes sensor data 157 and driver data 159. The intersection reservation module 604 uses the sensor data 157 and the driver data 159 to generate reservation data 161 and a traffic light control message, where the traffic light control message includes the reservation data 161. The reservation data 161 may include a signal status message, traveler information, and map data that conform to the SAE J2735 DSRC standard message sets.

The time-token transaction module 606 can be software including routines for conducting time-token transactions. In some embodiments, the time-token transaction module 606 can be a set of instructions executable by the processor 625 which, when executed by the processor 625, cause the processor 625 to execute one or more of the steps of the method 900 described below with reference to FIG. 9. In some embodiments, the time-token transaction module 606 can be stored in the memory 627 of the computer system 600 and can be accessible and executable by the processor 625. The time-token transaction module 606 may be adapted for cooperation and communication with the processor 625 and other components of the computer system 600 via signal line 626.

The time-token transaction module 606 may identify a time-token balance associated with a particular vehicle and/or user. For example, the time-token transaction module 606 may determine a time-token balance associated with a driver of the first vehicle 121 and time-token balances associated with any passengers in the first vehicle 121. The time-token balance associated with each user may be maintained centrally by a time-token server 160. The time-token transaction module 606 may conduct time-token transactions based on how reserving the intersection for one of the vehicles affects the other vehicles. For example, in an empty intersection with single vehicle, the driver will not earn or lose time-tokens and the intersections will be reserved for the vehicle. However, in a busy intersection, by reporting low urgency, the driver will not have a priority to pass through the intersection compared to other drivers reporting high urgency; however, the driver can earn time-tokens to spend later at times of actual high urgency.

In some embodiments, the time-token transaction module 606 conducts time token transactions using a Vickrey-Clarke-Groves (VCG) mechanism approach such that each driver is charged with an amount corresponding to the deviation between the intersection scheduling for the other drivers when the other drivers have been or have not been present at the intersection. In some embodiments, the time-token transaction module 606 pays a certain amount of time-tokens, which depends on the number of vehicles at the intersection. In some embodiments, drivers with zero or negative time-token balances can only request the lowest urgency level, and through this base time-token payment, the drivers can earn time-tokens to use at later times. The VCG mechanism based approach may ensure truthful information disclosure by the drivers.

In some embodiments, the time-token transaction module 606 identifies high priority vehicles, such as ambulances and fire trucks, and allows the drivers to have infinite time-token balances to spend seamlessly at times of urgency. In some embodiments, the passengers of a vehicle may also share the time-token balance. For example, a user may be able to designate their account as the one that has time-token balances deducted or all travelers may be able to designate their time-token balances for sharing the cost equally. In some embodiments, the time-token transaction module 606 receives instructions from the reservation application 199A associated with the first vehicle 121 and reservation applications 199B associated with mobile devices 110 in order to enable the sharing.

Figure 8A:
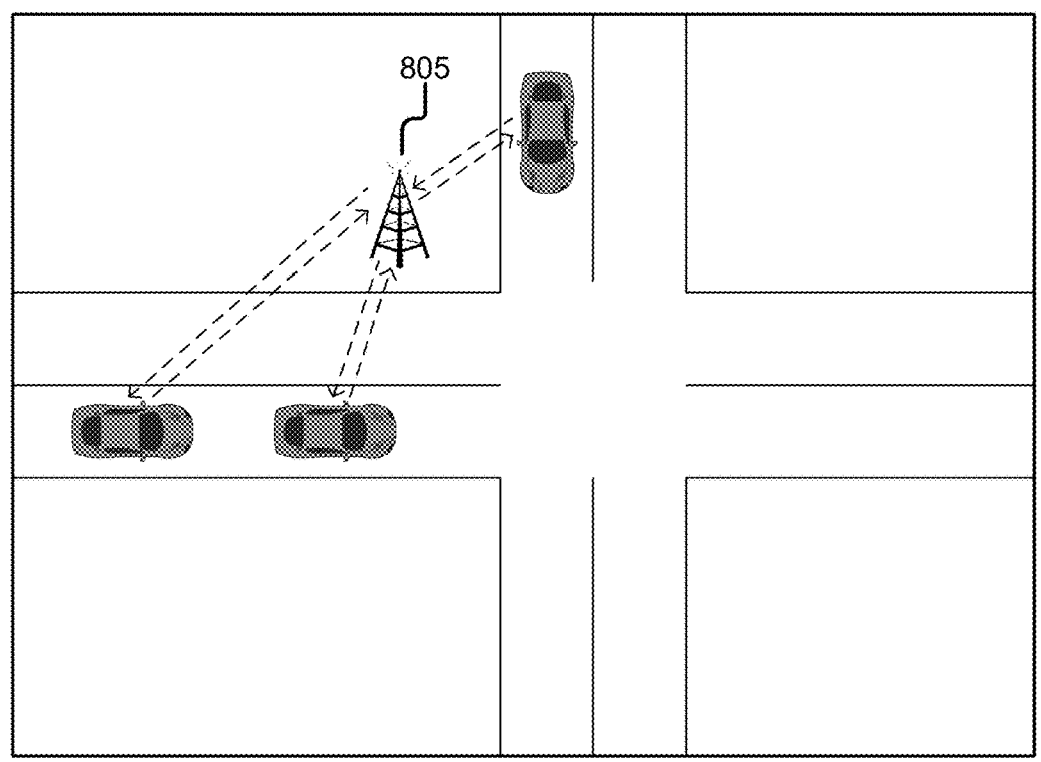
FIGS. 8A-8B are a block diagrams illustrating an example overview of the system according to some embodiments.

Turning to FIG. 8A, a block diagram 800 illustrates an example overview of the system. As each vehicle in FIG. 8A approaches the intersection, the vehicle communicates with the connected roadway device 805. This communication brings in new dimensions to intersection management. For example, the urgency for drivers may not be identical. Delays due to congestions at intersections are more costly for a driver trying to catch a flight or go to work on time than a driver going on a shopping trip. Furthermore, high priority vehicles, such as police vehicles, ambulances, or fire trucks, can have exceptionally high urgency.

Figure 8B:
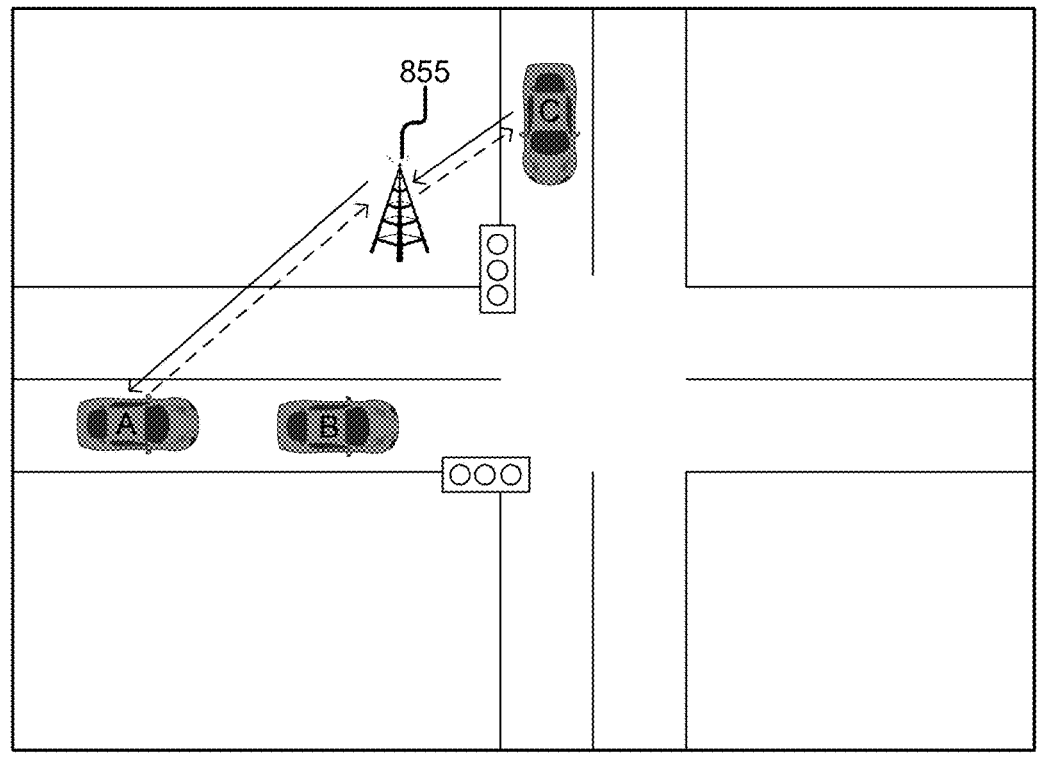

FIG. 8B illustrates a block diagram 850 of how the system works with a traffic management application 124 and a reservation application 199. The following scenarios assume that vehicles A, B, and C arrived to the intersection at the same time slot. Vehicles A and C have DSRC radios and can communication with the connected roadway device 855. Vehicle B does not have a DSRC radio.

In the first scenario, vehicle C has a high level of urgency and the intersection reservation module 604 uses a scheduling protocol, in which vehicles with a high-level of urgency have more priority than vehicles with a lower-level of urgency. The intersection reservation module 604 reserves the intersection first for vehicle C and the traffic light at the direction of top to down turns to green first. As a result, vehicles A and B have to wait for vehicle C to pass through the intersection. The time-token transaction module 606 charges vehicle C accordingly while vehicle A earns time tokens. Vehicle B does not earn time tokens because vehicle B is not equipped with a DSRC radio or a reservation application 199.

In the second scenario, vehicle A has a high level of urgency. However, vehicle A cannot pass through the intersection before vehicle B because vehicle A is travelling behind vehicle B. When the traffic light in the direction of left to right turns to green first, vehicle C needs to wait for both vehicles A and B to pass through the intersection. The time-token transaction module 606 takes the wait time for vehicle A into consideration and charges vehicle A less than if vehicle A did not have to wait for vehicle B. Vehicle C will earn time-tokens and vehicle B will not be charged for time tokens because vehicle B is not equipped with a DSRC radio or a reservation application 199.

In some embodiments, the time-token transaction module 606 receives a request from the reservation application 199 to increase the time-token balance. For example, a driver may pay to increase the time-token balance either in cash or crypto-currencies. For example, $1 may increase the time-token balance by 1. The time-token transaction module 606 may update the time-token balance accordingly.

Example Method

Figure 9:
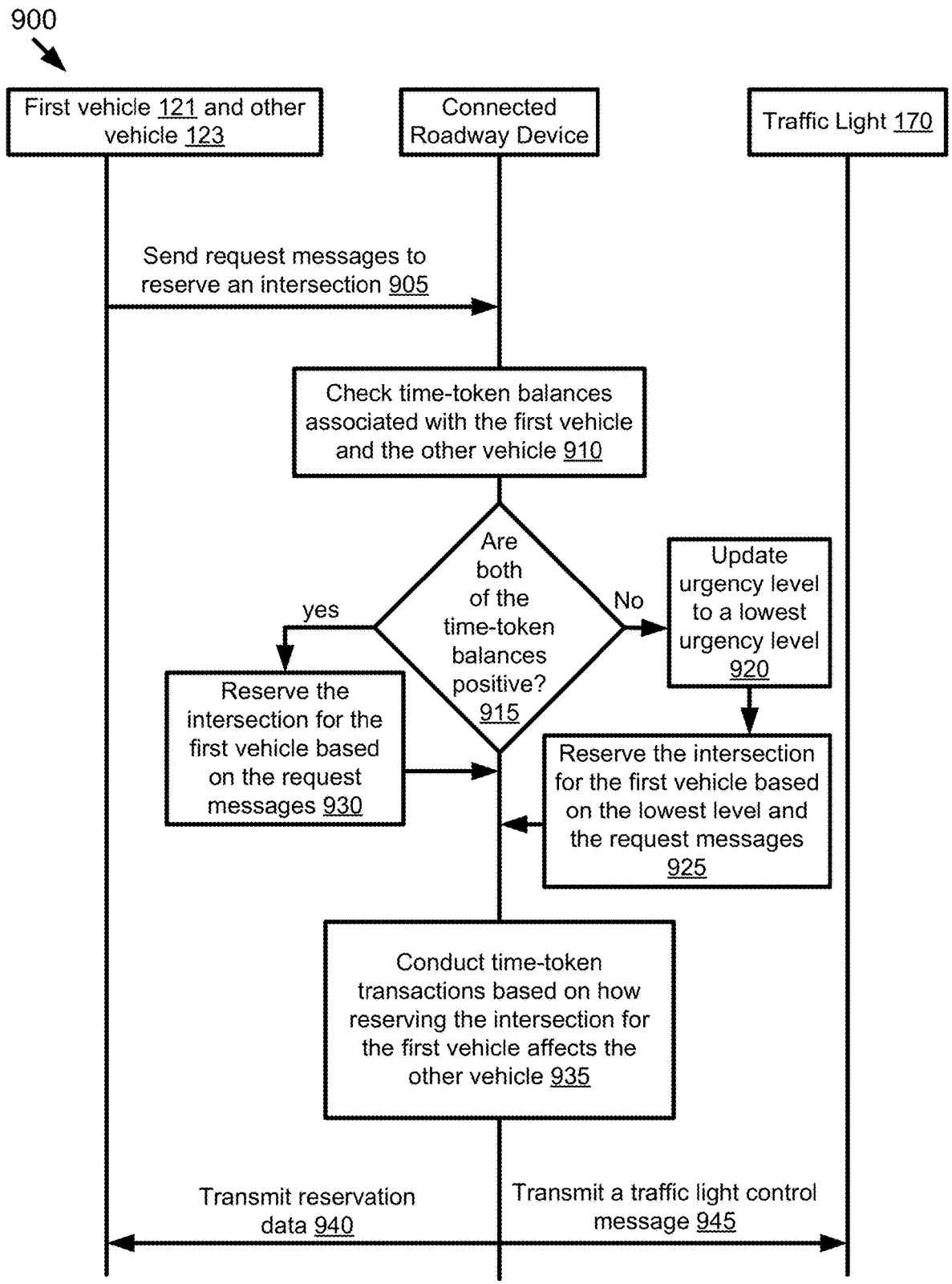
FIG. 9 is a flowchart of an example method for managing roadway interactions according to some embodiments.

Referring now to FIG. 9, depicted is a method 900 for managing roadway interactions according to some embodiments. The steps may be performed by a first vehicle 121 an other vehicle 123, a connected roadway device, such as an RSU 122, and a traffic light 170, consistent with the entities illustrated in FIG. 1, FIG. 2, and/or FIG. 6.

At step 905, request messages are sent to the connected roadway device to reserve an intersection. The request messages may be sent during a particular time slot. The connected roadway device may determine that the first vehicle 121 and the other vehicle 123 will be at the intersection at substantially a same time. At step 910, the connected roadway device checks time-token balances associated with the first vehicle 121 and the other vehicle 123. At step 915, the connected roadway device determines whether both of the time-token balances are positive. If any of the time-token balances are not positive, at step 920 the connected roadway device updates an urgency level to a lowest urgency level and at step 925 the connected roadway devices reserves the intersection for the first vehicle 121 based on the lowest level and the request messages. If both of the time-token balances are positive, at step 930 the connected roadway devices reserves the intersection for the first vehicle 121 based on the request message.

At step 935 the connected roadway device conducts time-token transactions based on how reserving the intersection for the first vehicle affects the other vehicle. At step 940 the connected roadway device transmits reservation data to the first vehicle 121 and the other vehicle 123. At step 945, the connected roadway device transmits a traffic light control message to the traffic light 170.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein.

This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, at a connected roadway device, request messages from a first vehicle and an other vehicle to reserve an intersection;
   checking time-token balances associated with the first vehicle and the other vehicle;
   responsive to a time-token balance associated with the other vehicle being negative, updating the other vehicle to be associated with a low urgency level and reserving the intersection for the first vehicle;
   adding to a corresponding time-token balance associated with the other vehicle based on the other vehicle being associated with the low urgency level and the other vehicle not receiving priority for the intersection; and
   generating graphical data for displaying a user interface that includes an option for specifying a level of urgency for the intersection, a transaction with an amount, a resulting time-token balance, and an explanation for why a time token was credited or debited to an account associated with a user of the first vehicle.

2. The method of claim 1, wherein the user interface further includes an option to specify a destination that the first vehicle is travelling towards and a high urgency level associated with the first vehicle.

3. The method of claim 1, further comprising:
   conducting time-token transactions based on how reserving the intersection for the first vehicle affects the other vehicle, wherein the time-token transactions are based on a high urgency level associated with the first vehicle, the low urgency level associated with the other vehicle, a number of travelers in the first vehicle and the other vehicle, and the time-token balances corresponding to the first vehicle and the other vehicle.

4. The method of claim 3, wherein an amount of conducted time-token transactions on each time-token account is computed using a Vickrey-Clarke-Groves (VCG) mechanism.

5. The method of claim 1, wherein the request messages each include a basic safety message that describes a heading and a path history of a corresponding vehicle and further comprising:
   determining whether the first vehicle and the other vehicle will be at the intersection at substantially a same time based on the request messages; and
   conducting time-token transactions based on how reserving the intersection for the first vehicle affects the other vehicle.

6. The method of claim 1, wherein the connected roadway device is a roadside unit (RSU).

7. The method of claim 1, further comprising:
   transmitting reservation data to the first vehicle and the other vehicle; and
   transmitting a traffic light control message to a traffic light, wherein the traffic light control message instructs the traffic light to display a green light while the first vehicle moves through the intersection.

8. A system comprising:
   one or more processors of a connected roadway device that includes a non-transitory memory storing computer code which, when executed by the one or more processors causes the one or more processors to:
      receive request messages from a first vehicle and an other vehicle to reserve an intersection;
      check time-token balances associated with the first vehicle and the other vehicle;
      responsive to a time-token balance associated with the other vehicle being negative, update the other vehicle to be associated with a low urgency level and reserve the intersection for the first vehicle;
      add to a corresponding time-token balance associated with the other vehicle based on the other vehicle being associated with the low urgency level and the other vehicle not receiving priority for the intersection; and
      generate graphical data for displaying a user interface that includes an option for specifying a level of urgency for the intersection, a transaction with an amount, a resulting time-token balance, and an explanation for why a time token was credited or debited to an account associated with a user of the first vehicle.

9. The system of claim 8, wherein the user interface further includes an option to specify a destination that the first vehicle is travelling towards and a high urgency level associated with the first vehicle.

10. The system of claim 8, wherein the computer code is further operable to cause the one or more processors to:
   conduct time-token transactions based on how reserving the intersection for the first vehicle affects the other vehicle, wherein the time-token transactions are based on a high urgency level associated with the first vehicle, the low urgency level associated with the other vehicle, a number of travelers in the first vehicle and the other vehicle, and the time-token balances corresponding to the first vehicle and the other vehicle.

11. The system of claim 10, wherein an amount of conducted time-token transactions on each time-token account is computed using a Vickrey-Clarke-Groves (VCG) mechanism.

12. The system of claim 8, wherein the request messages each include a basic safety message and the computer code is further operable to cause the one or more processors to:
   determine whether the first vehicle and the other vehicle will be at the intersection at substantially a same time based on the request messages; and
   conduct time-token transactions based on how reserving the intersection for the first vehicle affects the other vehicle.

13. The system of claim 8, wherein the connected roadway device is a roadside unit (RSU).

14. The system of claim 8, wherein the computer code is further operable to cause the one or more processors to:
   transmit reservation data to the first vehicle and the other vehicle; and
   transmit a traffic light control message to a traffic light, wherein the traffic light control message instructs the traffic light to display a green light while the first vehicle moves through the intersection.

15. A non-transitory memory encoded with a computer program, the computer program comprising instructions that, when executed by one or more processors, cause the one or more processors to perform operations comprising:
   receiving, at a connected roadway device, request messages from a first vehicle and an other vehicle to reserve an intersection;
   checking time-token balances associated with the first vehicle and the other vehicle;
   responsive to a time-token balance associated with the other vehicle being negative, updating the other vehicle to be associated with a low urgency level and reserving the intersection for the first vehicle;
   adding to a corresponding time-token balance associated with the other vehicle based on the other vehicle being associated with the low urgency level and the other vehicle not receiving priority for the intersection; and
   generating graphical data for displaying a user interface that includes an option for specifying a level of urgency for the intersection, a transaction with an amount, a resulting time-token balance, and an explanation for why a time token was credited or debited to an account associated with a user of the first vehicle.

16. The non-transitory memory of claim 15, wherein the user interface further includes an option to specify a destination that the first vehicle is travelling towards and a high urgency level associated with the first vehicle.

17. The non-transitory memory of claim 15, wherein the instructions are further operable to perform operations comprising:
   conducting time-token transactions based on how reserving the intersection for the first vehicle affects the other vehicle, wherein the time-token transactions are based on a high urgency level associated with the first vehicle, the low urgency level associated with the other vehicle, a number of travelers in the first vehicle and the other vehicle, and the time-token balances corresponding to the first vehicle and the other vehicle.

18. The non-transitory memory of claim 17, wherein an amount of conducted time-token transactions on each time-token account is computed using a Vickrey-Clarke-Groves (VCG) mechanism.

19. The non-transitory memory of claim 15, wherein the request messages each include a basic safety message and the instructions are further operable to perform operations comprising:
   determining whether the first vehicle and the other vehicle will be at the intersection at substantially a same time based on the request messages; and conducting time-token transactions based on how reserving the intersection for the first vehicle affects the other vehicle.

20. The non-transitory memory of claim 15, wherein the connected roadway device is a roadside unit (RSU).

* * * * *